(12) United States Patent
Dolgoff

(10) Patent No.: US 6,392,689 B1
(45) Date of Patent: May 21, 2002

(54) SYSTEM FOR DISPLAYING MOVING IMAGES PSEUDOSTEREOSCOPICALLY

(76) Inventor: Eugene Dolgoff, 139 Linden Ave., Westbury, NY (US) 11590

( * ) Notice: Subject to any disclaimer, the term of this patent is extended or adjusted under 35 U.S.C. 154(b) by 0 days.

(21) Appl. No.: 09/183,795

(22) Filed: Oct. 30, 1998

Related U.S. Application Data

(60) Division of application No. 08/963,016, filed on Nov. 3, 1997, now Pat. No. 5,900,982, which is a continuation-in-part of application No. 08/384,720, filed on Feb. 6, 1995, now abandoned, and a division of application No. 08/223,479, filed on Apr. 4, 1994, now abandoned, which is a continuation-in-part of application No. 07/659,596, filed on Feb. 21, 1991, now Pat. No. 5,300,942.
(60) Provisional application No. 60/063,955, filed on Oct. 31, 1997.

(51) Int. Cl.[7] .............................................. H04N 13/00
(52) U.S. Cl. .......................................... 348/44; 359/466
(58) Field of Search .............................. 348/44, 49, 50, 348/51, 54; 352/62, 57, 60, 63; 359/23, 26, 478, 465, 464, 466, 619; 345/32

(56) References Cited

U.S. PATENT DOCUMENTS

| | | | |
|---|---|---|---|
| 2,865,988 A | * 12/1958 | Cafarelli, Jr. | 348/44 |
| 4,151,549 A | * 4/1979 | Bautze | 348/44 |
| 4,641,177 A | * 2/1987 | Ganss | 348/44 |
| 4,807,024 A | * 2/1989 | McLauren et al. | 348/50 |
| 5,157,484 A | * 10/1992 | Pritchard et al. | 348/50 |
| 5,300,942 A | * 4/1994 | Dolgoff | 345/32 |
| 5,325,193 A | * 6/1994 | Pritchard et al. | 348/50 |
| 5,481,321 A | * 1/1996 | Lipton | 359/465 |
| 5,900,982 A | * 5/1999 | Dolgoff et al. | 359/619 |

* cited by examiner

*Primary Examiner*—Chris Kelley
*Assistant Examiner*—Gims Philippe
(74) *Attorney, Agent, or Firm*—Elman & Associates; Gerry J. Elman

(57) ABSTRACT

A system for displaying moving images from image information, e.g. on videotape or disk, in the form of a series of image frames to be displayed sequentially over a period of time. The image information does not contain stereoscopic information captured at the origin. As in conventional stereoscopic display, at any particular point in time, two image frames, A and B, are displayed simultaneously, one to each of the observer's eyes. However image frames A and B are generated from a single source of sequential image information. Image frame A is derived from a frame F1 and frame B is derived from a frame F2 of the series of source image frames. Frame F2 is positioned to be conventionally displayed after frame F1 by about 0.0167 and about 0.033 seconds. The system may include a screen on which the images are projected or otherwise displayed, the screen being at a distance D from an observer, wherein the image that is perceived by an observer upon binocular fusion of image frame A and B when their content is identical appears to be at a distance from the observer that is different from said distance D. Further detection and manipulation of the images may be performed, creating the perception that different elements within the scene appear at different depths.

18 Claims, 14 Drawing Sheets

SYSTEM FOR DISPLAYING MOVING IMAGES PSEUDOSTEREOSCOPICALLY

CROSS REFERENCE TO RELATED APPLICATIONS

This is a continuing application in the nature of a divisional of U.S. patent application Ser. No. 08/963,016, filed Nov. 3, 1997, now U.S. Pat. No. 5,900,982, which is a continuation-in-part of U.S. patent application Ser. No. 08/384,720, filed Feb. 6, 1995, and a divisional of U.S. patent application Ser. No. 08/223,479, filed Apr. 4, 1994, which is a continuation-in-part of U.S. patent application Ser. No. 07/659,596, filed Feb. 21, 1991, now U.S. Pat. No. 5,300,942. This application also claims priority from provisional U.S. patent application serial No. 60/063,955, filed Oct. 31, 1997. The disclosure of the aforesaid applications and patents are incorporated herein by reference.

FIELD OF THE INVENTION

The Invention relates to 3-D imaging techniques.

SUMMARY OF THE INVENTION

The present invention provides a system for displaying moving images pseudostereoscopically. Such a system comprises a single source of sequential image information, e.g. on cinema film, videotape, digital video disk, computer memory, or the like. The image information is generally in the form of a series of image frames adapted to be displayed sequentially over a period of time. In accordance with the present invention, the image information does not contain stereoscopic information captured at the origin. That is, it does not contain images captured simultaneously from two vantage points nor does it contain any other source from which stereoscopic information may conventionally be derived.

In the system of the present invention, there are employed any of a variety of means for sequentially displaying a first series of image frames to one of the two eyes of an observer, and a second series of image frames to the other eye. For example, the observer (sometimes alternatively referred to as the "viewer") may be provided with a headset having a pair of LCD displays, one in front of each eye; or two projectors may project differently colored or differently polarized light onto a theatre screen, and each observer would wear glasses having differently colored or differently polarized elements for the two eyes. Further examples and alternatives of such means are provided hereinbelow.

Just as in conventional stereoscopic display, at any particular point in time, two image frames, A and B, are displayed simultaneously, one to each of the observer's eyes. However, in accordance with the present invention, image frames A and B are both generated from the single source of sequential image information. At a particular point in time, image frame A is derived from some particular source frame of the series of image frames in the single source of sequential image information. Call this particular frame F1. At that same point in time, image frame B is derived from a different source frame (F2) that is part of the same series of image frames in the source of sequential image information. The source frame F2 is located in the source of sequential image information to be displayed a certain amount of time after source frame F1 when the sequential image information is conventionally display, as, for example, by a video playback. Call that amount of time T. T is selected such that a typical observer experiences the display as a scene having depth.

The present inventor has found that for viewing typical content via cinema or video systems, the optimal amount of time T is between about 0.0167 and about 0.033 seconds. For example and not by way of limitation, when the left eye of the observer is shown frame F1, the right eye is shown a different frame, F2, which is on the same cartridge of videotape but spaced apart by a distance that corresponds with a time difference of about 0.0245 or 0.025 seconds. It is preferred to use 0.025 seconds as the interval.

The term 'frame' as used herein applies to each 'field,' as that term is used in connection with NTSC or other forms of interleaved or interlaced television signals.

Some of the embodiments use polarized light to control which eye sees which image. In the light path to each eye, when planar polarization is employed, the planes of polarization are mutually perpendicular, so as to be complimentary to each other so that each eye does not see the image intended for the other eye.

As detailed herein, two identical images projected onto a screen which are horizontally offset from one another and polarized perpendicular to each other will appear somewhat three-dimensional to a viewer wearing polarized glasses because the image will appear in a different plane from the screen.

The present invention provides a system for displaying moving images pseudostereoscopically, comprising; a single source of sequential image information, comprising a series of source image frames adapted to be displayed sequentially over a period of time and not containing stereoscopic information captured at the origin of said series of image frames, a first means, for sequentially displaying a first series of display image frames to one of the two eyes of an observer; and a second means, for sequentially displaying a second series of display image frames to the other of the two eyes of an observer; and means for generating from said single source of sequential image information for simultaneous sequential display, an image frame A of said first series of display image frames and an image frame B of said second series of display image frames, wherein said image frame A is derived from a frame F1 of said series of source image frames and said image frame B is derived from a frame F2 of said series of source image frames, wherein said frame F2 is positioned in said single source of sequential image information to be displayed after said frame F1 by an amount of time T, the amount of time T being selected such that a typical observer experiences the display as a scene having depth.

The amount of time T is between about 0.0167 and about 0.033 seconds. The time T is preferably about 0.025 seconds.

The system preferably includes a screen on which the images are projected or otherwise displayed, the screen being at a distance D from an observer, wherein the image that is perceived by an observer upon binocular fusion of image frame A and image frame B when their content is identical appears to be at a distance from the observer that is different from said distance D.

In one embodiment, image frame A and image frame B are placed so that they appear to be in front of the screen. Alternatively, image frame A and image frame B are placed so that they appear to be behind the screen.

Landmark light is at least one of the following: a spotlight; a source of uniform illumination; a source of a pattern of illumination. Alternately, it is an illuminated frame placed near the display means.

It is preferable that said first means and said second means comprise means for providing first and second displays of image frames that are polarized complimentary to each other; and wherein said means for providing landmark light comprises a projector providing a non-polarized image derived from one of said source image frames.

Even without the landmark light, said first means and said second means preferably comprise means for providing first and second displays of image frames that are polarized complimentary to each other.

In another embodiment, there is means for detecting an object in successive source image frames; means E for detecting a change in a property of said object in successive source image frames; means for adjusting the display of image frame A and image frame B responsive to the output of said means E.

The methods and procedures of performing the present invention are also claimed by the inventor. The inventor regards as his invention, a method for pseudostereoscopically displaying moving images from a single source of sequential image information comprising the steps of: (a) providing a series of source image frames adapted to be displayed sequentially over a period of time and not containing stereoscopic information captured at the origin of said series of image frames; (b) sequentially displaying a first series of display image frames to one of the two eyes of an observer; (c) sequentially displaying a second series of display image frames to the other of the two eyes of an observer; and (d) generating from said series of source information frames for simultaneous sequential display an image frame A of said first series of display image frames and an image frame B of said second series of display image frames, wherein said image frame A is derived from a frame F1 of said series of source image frames and said image frame B is derived from a frame F2 of said series of source image frames, wherein said frame F2 is positioned in said single source of sequential image information to be displayed after said frame F1 by an amount of time T, the amount of time T being selected such that a typical observer experiences the display as a scene having depth.

In a further embodiment, the process continues with the additional steps of, (f) continually detecting an object in successive source image frames; (g) continually detecting a change in a property of said object in successive source image frames; and (h) continually adjusting the display of image frame A and image frame B responsive to the detected change in said property of said object.

In a first aspect of the aforementioned further embodiment, the property detected is vertical position that has changed between frame F1 and frame F2 and said adjustment is modifying said image frame B derived from F2 of said series of source image frames such that said change in vertical position of said object is eliminated.

In another aspect of the aforementioned further embodiment, said property is vertical position that has changed between frame F1 and frame F2 and said adjustment is modifying the value of time T to zero.

In another aspect of the aforementioned further embodiment, said property is horizontal position that has changed between frame F1 and frame F2 and said adjustment reversing polarity when the change in horizontal position would result in a typical observer experiencing the display as a scene having unrealistic depth.

Another way of looking at the present invention is as a three-dimensional viewing system capable of projecting a three-dimensional image onto a screen to be seen by an observer, comprising the steps of:storing at least one image in a buffer; displaying a buffer stored image on the screen at the same time the current frame is projected on the screen wherein two images are coded such that one image is directed to each eye of the observer, creating binocular fusion for the observer of all objects that have moved in time and space between the frames that are being simultaneously shown to the observer.

Yet another way of looking at an aspect of certain embodiments of the present invention is as a method of producing three-dimensional image information for subsequent viewing on a display in 3-D using software in a computer, wherein a user labels selected elements within a frame of image elements; wherein said software tracks selected image elements from frame to frame of image information; and produces a duplicate image of each labeled image item spaced at a distance from the original image item determined by the depth in three dimensions at which the selected image item is to appear after binocular fusion of the two images; wherein the said user can instruct said computer to change the depth at which an image item appears; wherein the software will alter the distance between the original image item and its duplicate so that, by binocular fusion, the viewer will see the image item changing depth as desired; wherein said image and its duplicate image are shown to the viewer such that the image is directed to one eye and the duplicate image is directed to the other eye, producing binocular fusion.

BRIEF DESCRIPTION OF THE DRAWINGS

The present invention, both as to its organization and its manner of operation, together with further objects and advantages, may be best understood by reference to the following description, in connection with the accompanying drawings.

DESCRIPTION OF PREFERRED EMBODIMENTS

Figure 1:
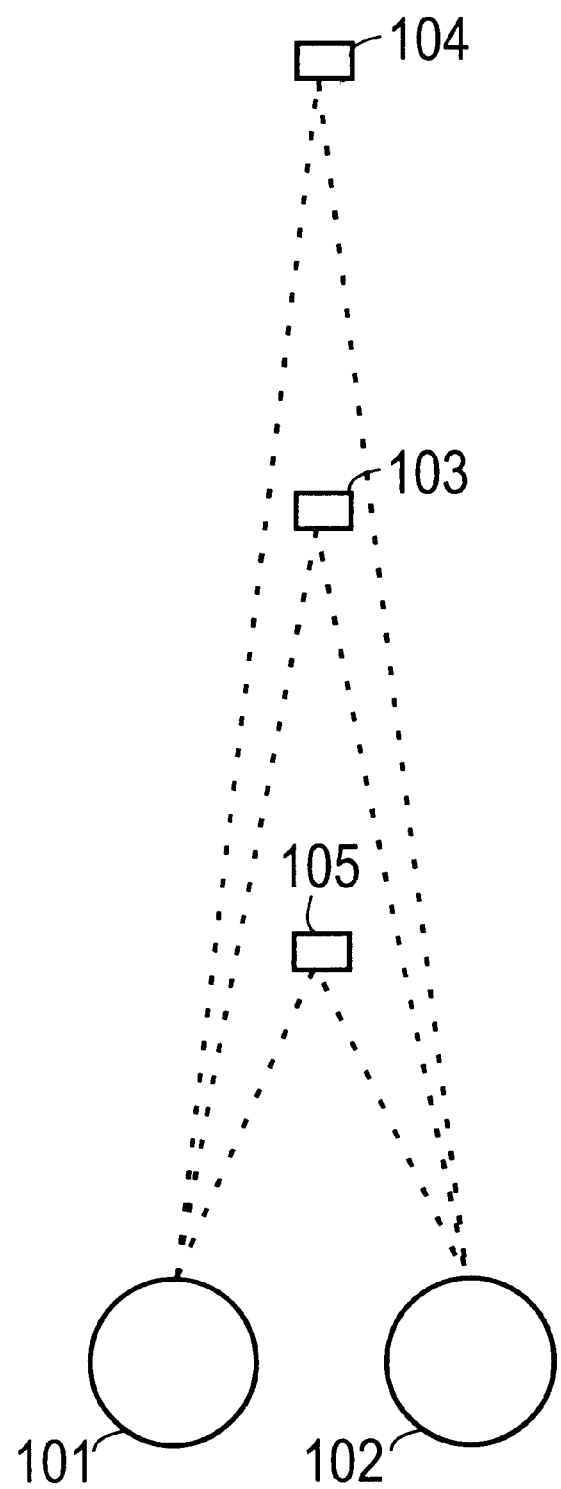
FIG. 1 is a diagrammatic plan view showing a pair of eyes, and objects at three different distances.

The inventor hereby incorporates by reference the disclosure of U.S. Pats. No. 5,012,274 and 5,300,942, allowed U.S. patent. application Ser. No. 08/963,016 (filed Nov. 3, 1997) and pertinent disclosure of any other publications and patents of the present inventor.

The first practical form of 3-D imaging was called stereoscopic imaging and was developed in 1840 by Sir Charles Wheatstone. This technique utilized two drawings of the same subject matter which differed slightly. When one drawing was viewed by the left eye and the other viewed by the right eye, it created the sensation of a three-dimensional drawing. Around 1850 Brewster extended this process by utilizing two photographs of a single scene, each taken from a slightly different angle. These "stereoscopic images" were viewed in a hand-held device called a stereoscope. Due to the three-dimensional effect achieved when viewing these images, people believed that this was all there was to re-creating three-dimensional images. The present inventor has studied 3-D imaging extensively and has discovered other important issues relevant to the perception of 3-D.

If one places one's arm out in front of oneself, at arms length, with one's thumb pointing in the air, with another person's face several feet beyond one's thumb, while concentrating on the detail of one's thumbnail, one will see a sharp single image of one's thumb while, peripherally, one will be aware of the person in front of one having two slightly blurry faces. If one then changes one's attention to the other person's face, it will become a sharp single image of the face, but the thumb will become two blurry thumbs. This demonstrates that the human optical system which uses two eyes cannot produce a single sharp image of more than one planar area at a time. At any given instance, most planes in view are visible only as blurred doubled images. The human brain apparently without conscious effort, suppresses those images since they are not consciously visible to the observer. Additionally, as one looks around in the environment, the perception is that one sees objects at many different distances simultaneously, all appearing as sharp single images. Since the human sees only one sharp single image of one plane at a time, this means that the brain integrates the many single images that the observer concentrates on in different planes sequentially over time to form the illusion of a volumetric area of three-dimensional space in which all objects appear as single, sharply focused images.

If a stationary observer concentrates on an object at a particular distance, the observer can immediately make an accurate estimate as to the distance between the observer and the object being concentrated on. Only two mechanisms have been found to account for that ability. These are called convergence and accommodation.

During convergence, the ocular muscles surrounding each eye swivel each eye within a horizontal plane so that the two retinal images of the two eyes corresponding to the object the observer is concentrating on overlap in the brain. When this happens, the brain must notice the tensions of those muscles to compute the distance from the observer to the object being looked at. The brain apparently is programmed to change the muscle tensions to produce a single image, with a minimum of image doubling. During accommodation, the lenses focus on the viewed object and adjust themselves to produce the sharpest focus.

Through experience, an observer's brain can interrogate the muscle tensions involved in convergence and accommodation and create the experience of distance to the viewed object. For each object distance, there would be a corresponding set of muscle tensions that the brain is used to perceiving, telling it what that distance is.

Typically, a stereoscopic image consists of two pictures that were taken from two slightly different angles with camera lenses in two different locations. Most elements are seen from two different angles in the two pictures. For instance, a stereoscopic pair of images of a person standing in front of a background will consist of two images of the person from two slightly different angles. In addition to the fact that the two different images of the person are different (showing the person from two slightly different angles), the images of the person will also be located in different positions with respect to the background in each picture. When the two stereoscopic images are viewed, one with each eye, the observer will see a three-dimensional image of the person and the background.

When viewing any stereoscopic image, a discrepancy is produced. The left-and right-eye images of a given object are located at different areas within the frame of each image (for images that should appear at different depths than the film plane itself). When the eyes converge to overlap the retinal images, the lenses change shape to produce those images in best focus. Since the images are in best focus only in the plane of the film, the brain will receive inconsistent input, wherein the muscle tensions involved in convergence do not match the expected muscle tensions involved in accommodation, as they normally do. The inventor's experiments have shown that, if there is a conflict between accommodation and convergence, the observer perceives the object at the distance indicated by convergence rather than the distance indicated by accommodation. This indicates that convergence is a stronger depth cue than accommodation in determining depth perception.

Pseudo-stereo

If the two images viewed stereoscopically (often called the stereo pair) are identical in every way except for the horizontal placement of one object (for instance, the image of a person), the eyes can converge and overlap either every aspect of the image except the person, or only the person. Either way, the muscle tensions perceived will be different when concentrating on the person than they are when concentrating on anything else in the picture. Consequently the picture will appear three-dimensional, and the person will appear to be at a different distance from the observer than the rest of the picture.

The "stereo pair" can be derived from a single image if one element, such as the "person" referred to above, is erased and reinserted at a different, horizontally displaced position with respect to the rest of the picture in one image of the "stereo pair" thus created. This is referred to as "pseudo-stereo" because, although a three-dimensional image is perceived, both images were generated from a single two-dimensional image which had no 3-D information and each element (the person and the background) is still perceived as flat.

If the two images are identical in every way, when the eyes converge the two images, the observer will perceive the two-dimensional image to be located in a different plane than the plane the two images are actually located within. For instance, if two identical photos are laid on a desk top and an observer looks at them and crosses her eyes to converge the two images, an image will be seen either floating above or below the desk top. If one of the images is altered so that different elements within the image are shifted different amounts from their original positions, then viewing the two images stereoscopically will cause the observer to see the different elements that were moved, at different depths since she will have to converge her eyes different amounts to produce a single image of each of the elements. Thus, the brain will detect the different muscle tensions when viewing the different image elements, creating the perception that they are located at different depths.

This is pseudostereoscopic because the original image contained no stereoscopic 3-D data.

Embodiments of the Invention

In a preferred embodiment, two identical video projectors are aimed at and focused on a metallized screen. The projectors beams are polarized perpendicular to each other. A single video source is split by a splitter device (for example, a distribution amplifier) so that it sends the same image information to each projector. The reader will note that if the images are aligned precisely on the screen and the observer wears polarized glasses, a regular two-dimensional image will be seen on the screen. Now, if one projector is moved slightly so that its image is displaced horizontally from the other projector's image, the eyes of the observer will now have to converge or diverge differently when looking at the image on the screen than they do when looking at the screen area itself. The difference in muscle tensions will be perceived, and the observer will see the image as having some depth, since it will appear to exist in some location off the screen (either in front of it or behind it). Changing the amount of displacement of one projector's image in relation to the other will change the perceived depth location of the image. Many video projectors, such as those using LCDs, can produce a horizontal image displacement electronically.

FIG. 1 shows an observer's eyes in relation to objects at different distances from the eyes. An observer's left eye 101 and right eye 102 have differing amounts of convergence depending on how far an object is from the observer. To look at the first object 103, the eyes converge more than they do to look at a farther second object 104. Similarly, closer third object 105 causes the eyes to converge even more than they must in order to view first object 103 or second object 104. This helps illustrate how the eyes converge more or less to view objects that are more or less close to the observer.

Figure 2:
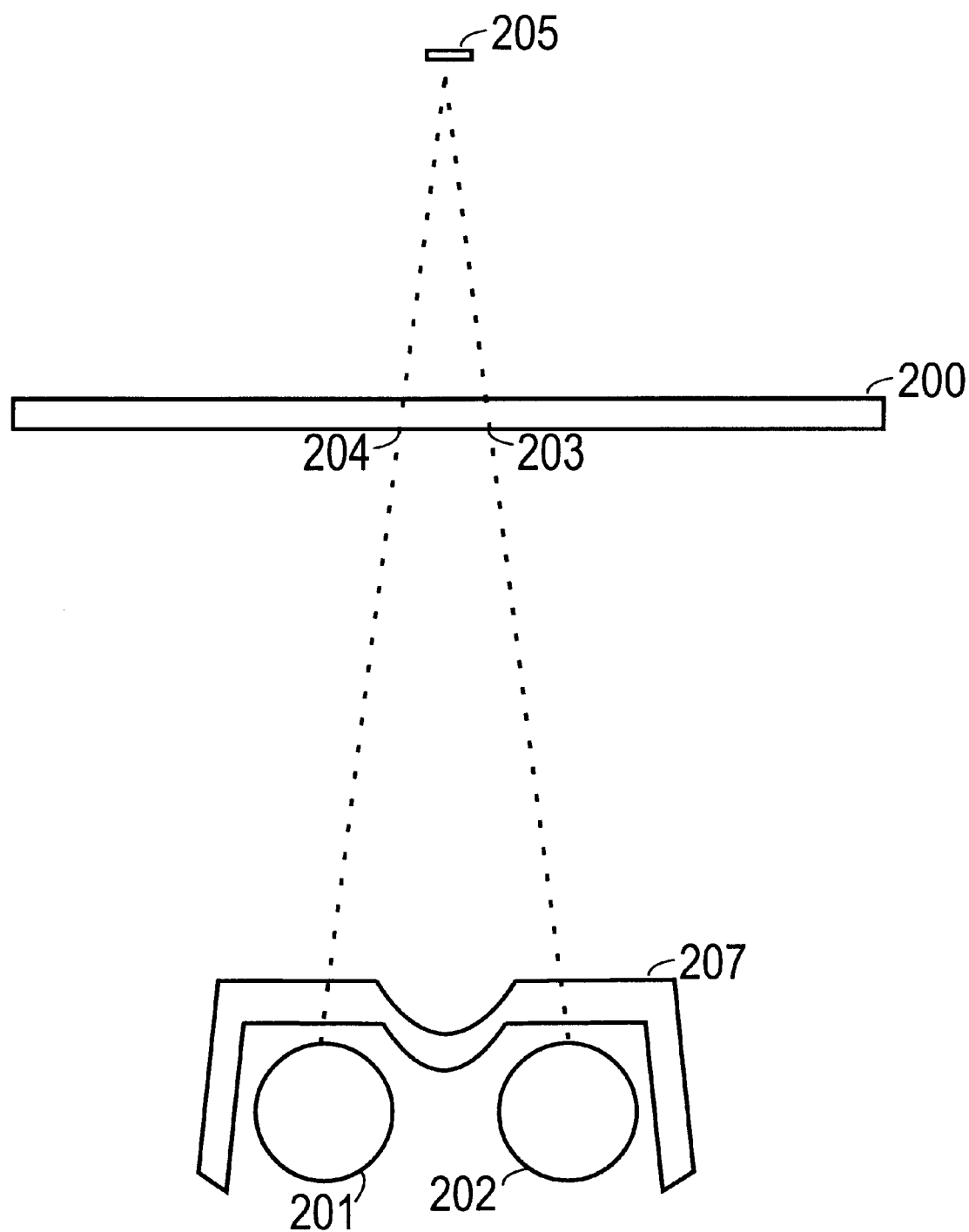
FIG. 2 is a diagrammatic plan view showing a pair of eyes resolving stereoscopic information.
Figure 3:
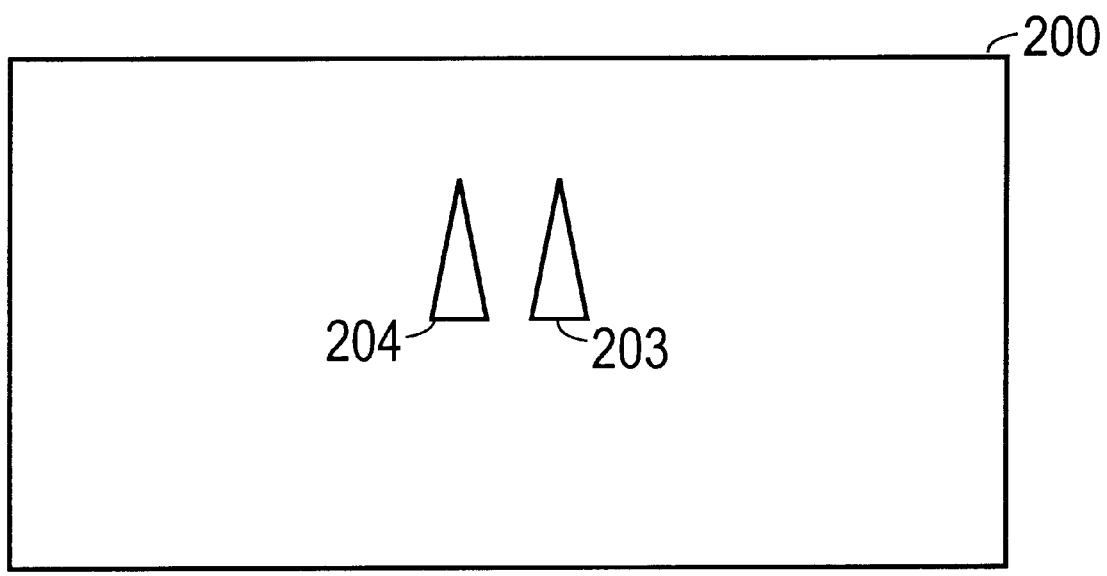
FIG. 3 is a head-on (i.e. elevation) view of a screen displaying stereoscopic information.

Referring now to FIGS. 2 and 3, an observer views output from a display system of the present invention. The output is displayed on a screen 200 and viewed through glasses 207 wherein each eye is polarized perpendicularly to each other. Observer's left eye 201 views one portion of the image 204, and the observer's right eye 202 views the other portion 203. Although the images are projected into the plane of screen 200, a single image 205 appears to be behind the screen 200. As shown in FIG. 3, a first projector projects a first image 203, and a second projector projects a second image 204 onto screen 200.

Since the images are displaced horizontally from one another on the screen, they do not fall on corresponding locations on the retinas of the two eyes if the two eyes are converging on the screen 200. Consequently, they will not produce a single image in the brain. To correct for this, the left eye 201 must rotate counter-clockwise and the right eye 202 must rotate clockwise (as viewed from above). That is, the eyes rotate outward away from the nose, diverging. These rotations will cause the retinal images in each eye to move towards the central imaging area on each retina, causing them to overlap in the brain and create one image (i.e. "binocular fusion"). Since the eyes diverge further (than when the observer is converging on the screen to resolve this part of the image, this tells the brain that it is seeing an object farther from it than the screen 200. The observer thus perceives the image to be floating behind of the screen 200.

Figure 4:
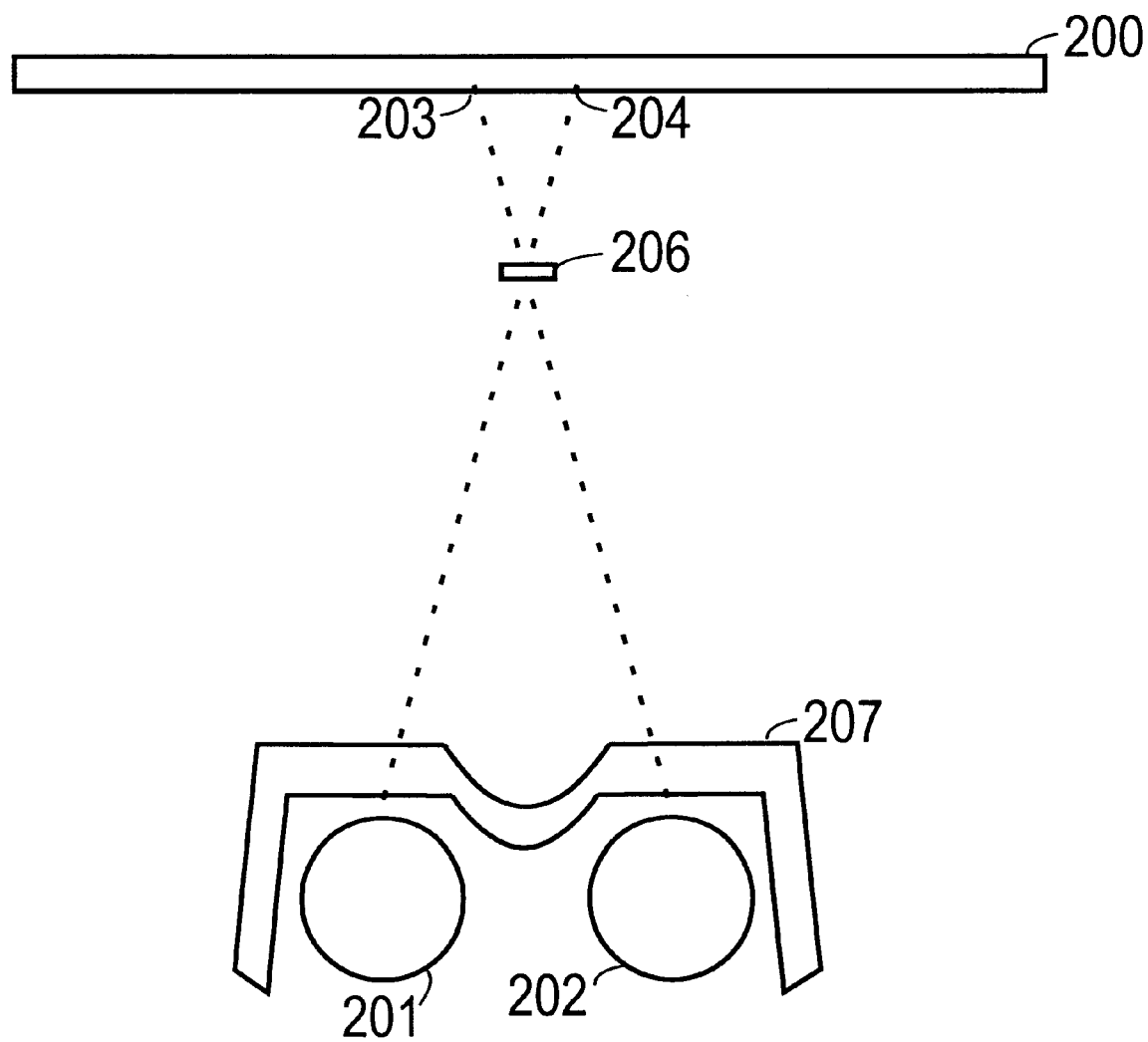
FIG. 4 is a diagrammatic plan view showing a pair of eyes resolving stereoscopic information.

Referring now to FIG. 4, the eyes are forced to view the images in different locations than in FIG. 2. (i.e. by switching aim of the projectors if the images are identical). The observer's left eye 201 perceives image 204, and observer's right eye 202 perceives image 203. The merged image 206 appears to be closer to the observer than the screen 200.

The eyes could also be forced to converge on an area of space closer to the observer than the screen by switching the polarity or the projectors, or switching the polarity of the glasses, i.e. by switching the projectors or by keeping the projector as before and causing the glasses to reverse polarity.

Figure 5:
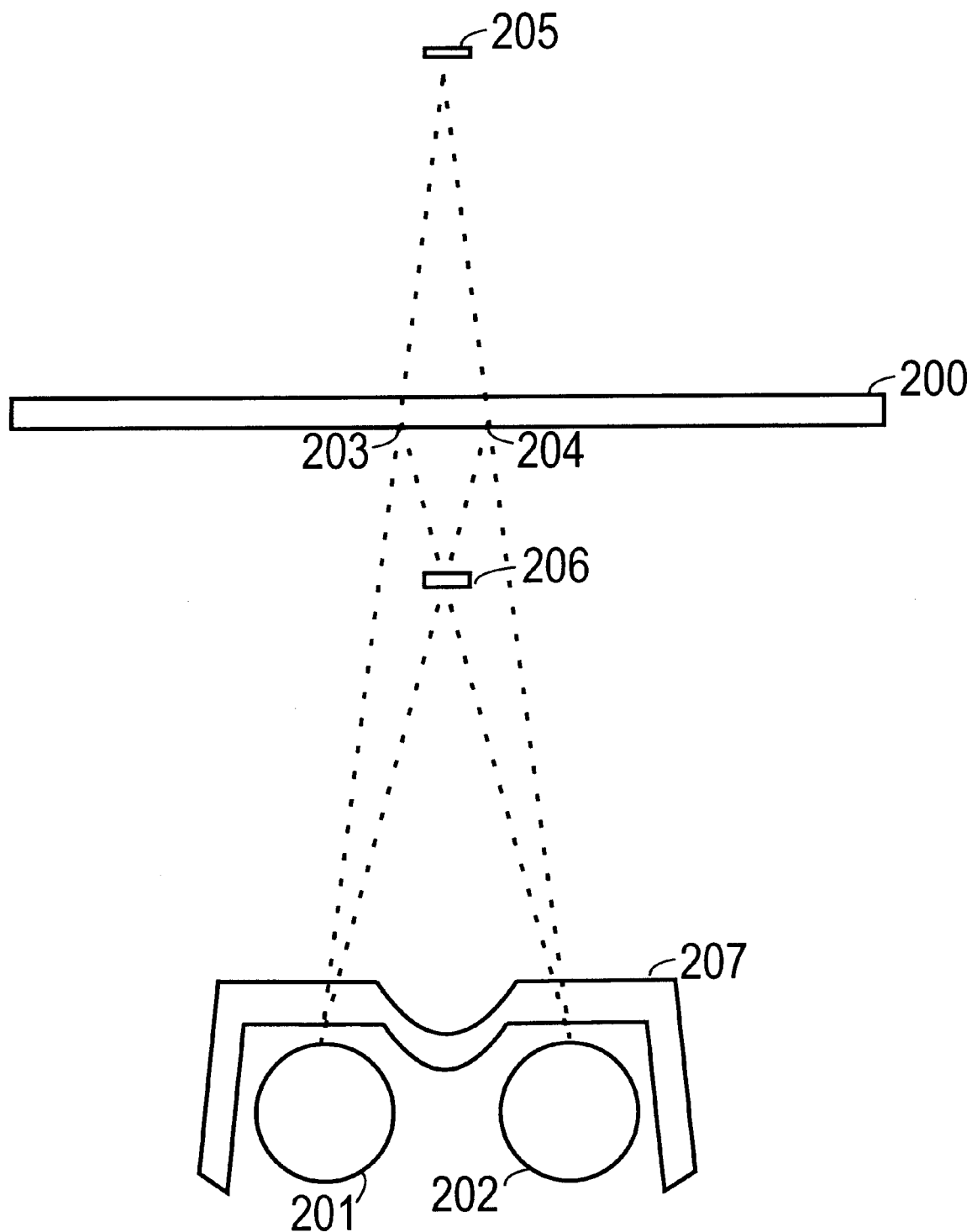
FIG. 5 is a diagrammatic plan view showing a pair of eyes resolving stereoscopic information.

Referring now to FIG. 5, the reader will appreciate that the placement of the first image 203 and the second image 204 results in images that appear in front of or behind the screen 200.

Figure 6:
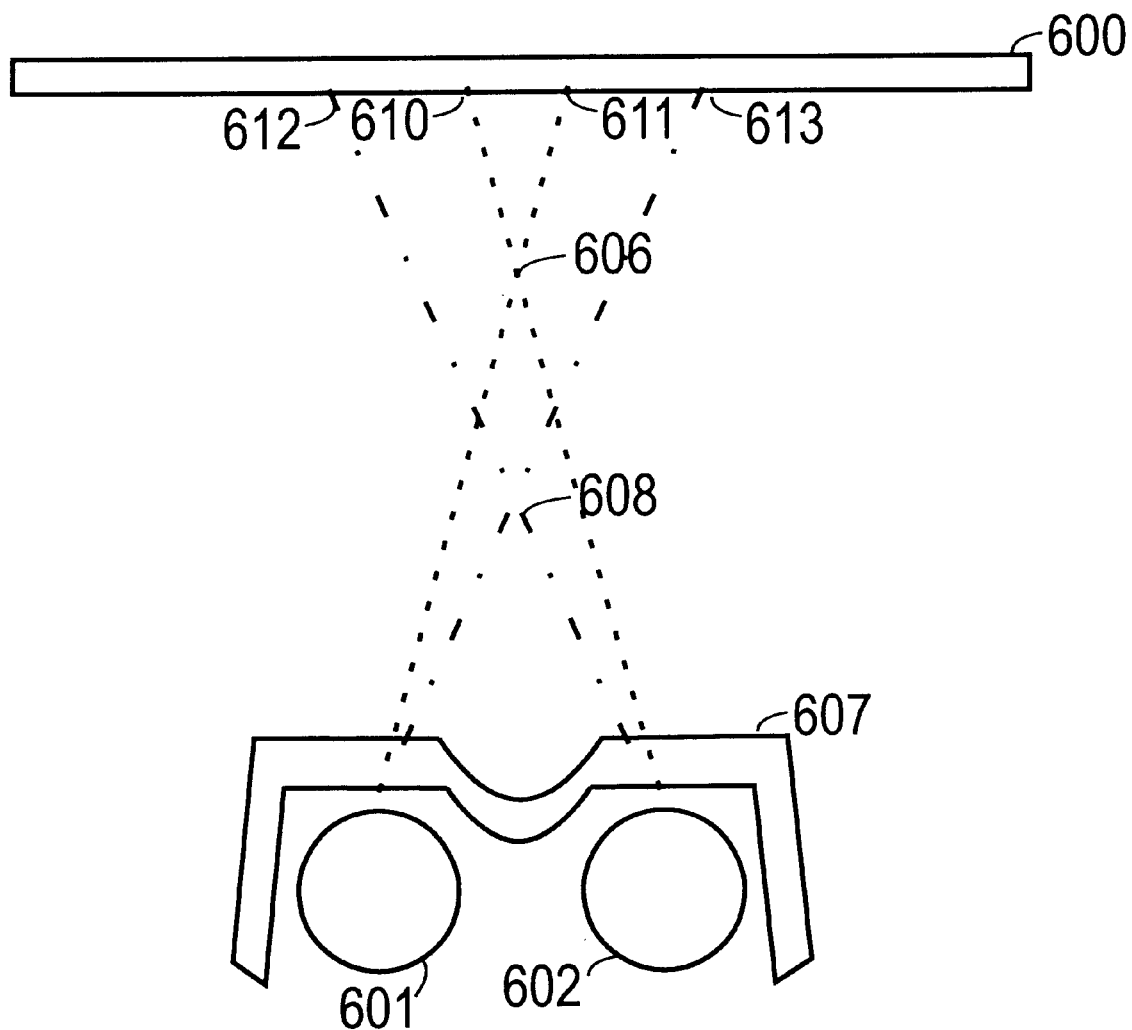
FIG. 6 is a diagrammatic plan view showing a pair of eyes resolving stereoscopic information.

In accordance with an alternative embodiment of the present invention, to increase depth perception certain scenes in the movie would be caused to trigger a variable displacement, creating the illusion, for instance, that an image in the movie is coming off the screen towards the observer. Referring now to FIG. 6, an observer watches a movie on a screen 600. The observer's left eye 601 and right eye 602 see through polarized glasses 607. As an example, if the movie shows a space ship floating in space and moving towards the observer, as it moves toward the observer, the relative horizontal displacement of the images can be gradually increased. This will cause a continuing change in convergence which will be perceived as the ship flying out of the screen toward the observer. For example, when the left eye sees the ship at point 610, and the right eye sees the ship at point 611, the ship is perceived as being at point 606. The object viewed will be perceived as moving from location 606 to location 608 by increasing the spacing between the first set of images 610–611 to the second set of images 612–613. One embodiment of this aspect of the present invention, which could use videotape, laser disc, DVD, CD, etc., would include a separate track on the same recording that the movie is on which can control the degree of horizontal displacement of one image by signaling a horizontal shift in one or both prjector's images as necessary. This can be done throughout the movie, creating depth effects as desired.

Figure 7:
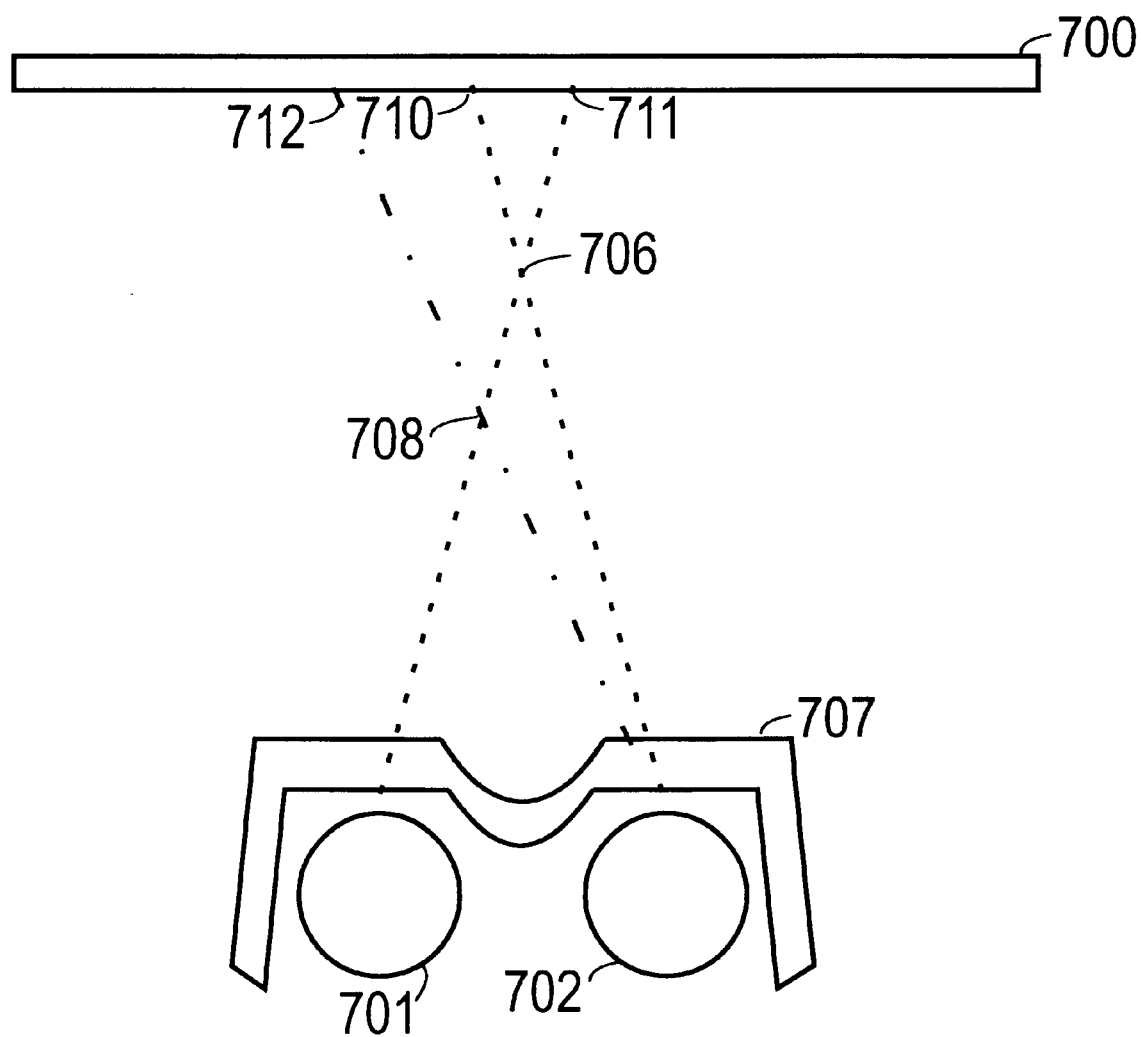
FIG. 7 is a diagrammatic plan view showing a pair of eyes resolving stereoscopic information.

In a preferred embodiment illustrated in FIG. 6, both images moved relative to the screen. In another embodiment, only one of the images needs to be moved relative to the screen, and that embodiment in illustrated in FIG. 7. An observer sits in front of a screen 700. The observer's left eye 701 and right eye 702 see through polarized glasses 707. An object appears at location 706 and moves closer to location 708, closer to the observer, when the distance between left eye image 711 and right eye image 710 is increased by moving the right eye image to position 712. The amount of displacement between first right eye image position 710 and the second right eye image position 712 is preferably controlled by information generated on a separate track.

The inventor's tests have shown that the human brain can make a much more accurate prediction regarding the distance to an image if there is at least one other landmark visible at a different distance from the observer. When viewing an image wherein such a landmark is visible at a different distance, concentrating on the image will cause the landmark to become a blurred double image. Shifting attention to the landmark, making it a single sharp image, will cause the other image to become a double image. In this way the brain can determine the relationship between the image and the landmark, further refining its estimate of depth to both the image and the landmark. This greatly enhances the perception of depth location and the three-dimensional relationship between the observer, the image, and the landmark. Consequently, various techniques can be used to enhance the three-dimensional appearance of such an image. Lighting can be used to illuminate the area behind the screen seen above, below and to the sides of the screen or directly behind the screen if it is perforated. A frame can be put around the screen which is illuminated. A spotlight can be projected onto the screen surface. Any type of pattern can be projected onto the screen surface. The screen can be uniformly lit. Another projector can be used to project the same image onto the screen, but with the lens mis-adjusted so that the image is so blurred that it cannot be recognized. In all cases the additional light is not polarized so that it can be seen equally by both eyes. That way, the additional light will appear to be a landmark in a different plane from the images, enhancing their three-dimensionality.

Figure 8:
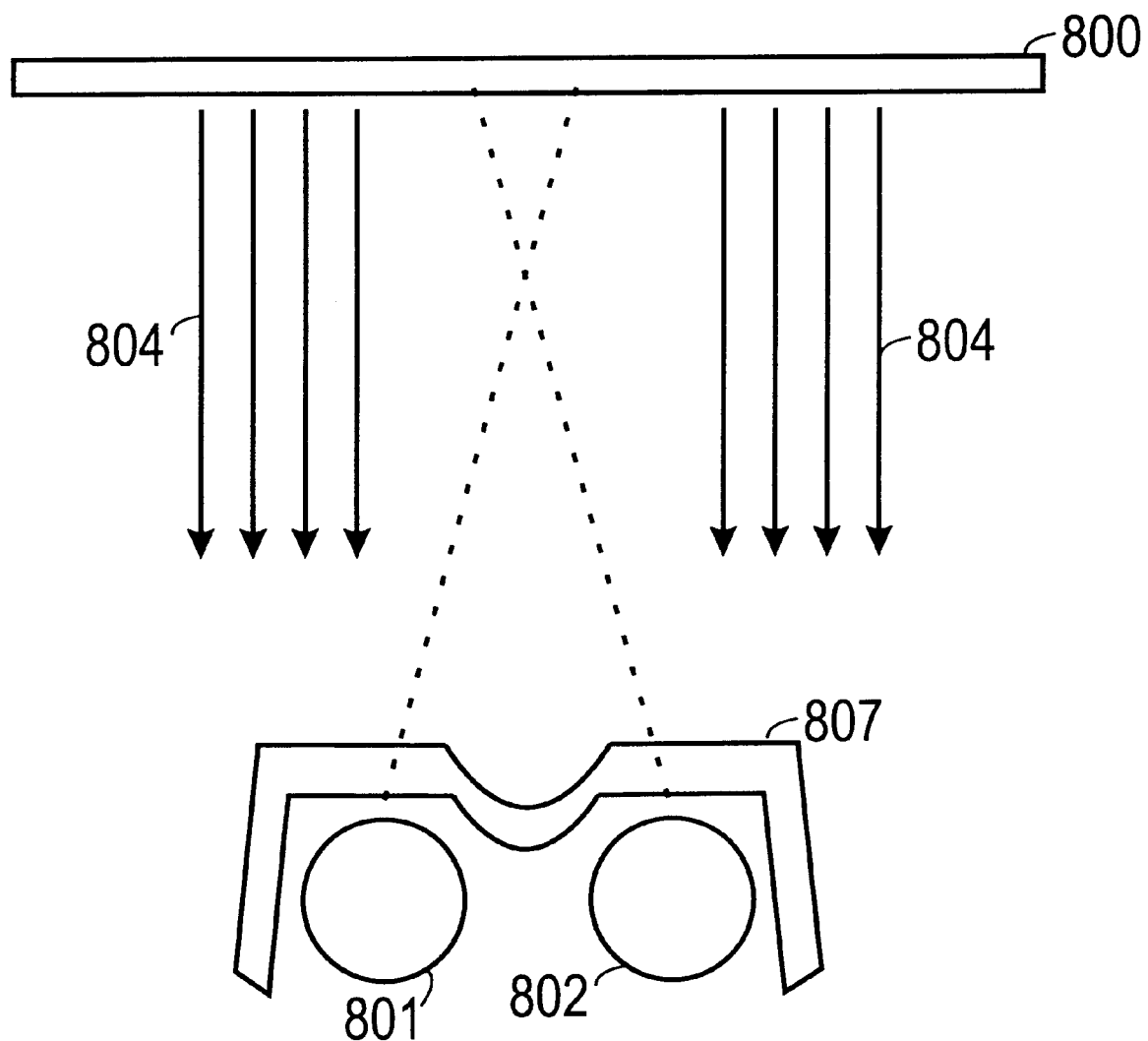
FIG. 8 is a diagrammatic plan view showing a pair of eyes resolving stereoscopic information.

Referring now to FIG. 8, a screen 800 is illuminated with light to increase an observer's perception of 3-D. The observer's left eye 801 and right eye 802 are behind perpendicularly polarized glasses 807. The light 804 reflected from the screen 800 reaches both eyes. The light projected on the screen may, for instance, be a spotlight, uniform illumination, any type of pattern, or a blurred version of the image projected by the other projectors. Since the light is in a different plane than the image, it acts as a landmark increasing the observer's perception of depth.

Figure 9:
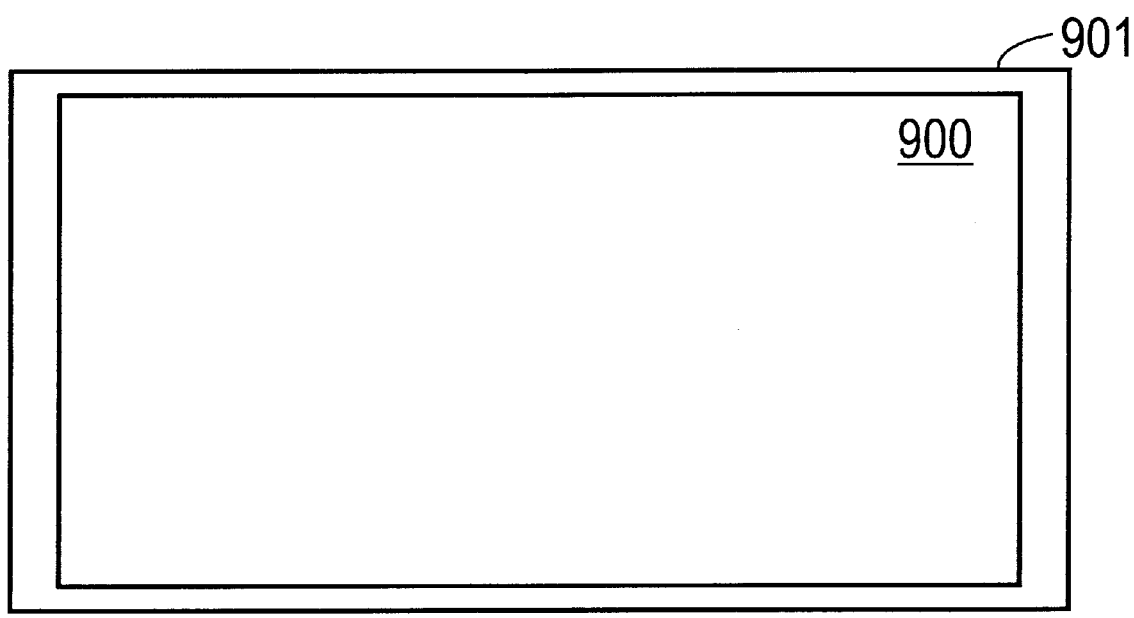
FIG. 9 is a head-on (i.e. elevation) view of a screen displaying landmark light.

Referring now to FIG. 9, a screen 900 is surrounded by an illuminated frame 901. Since the light is in a different plane than the image, it acts as a landmark increasing the observer's perception of depth.

As detailed above, two identical images projected onto a screen which are horizontally offset from one another and polarized perpendicular to each other will appear somewhat three-dimensional to a viewer wearing polarized glasses because the image will appear in a different plane from the screen.

In a preferred embodiment, the polarizers in the glasses are oriented to a 45 degree angle to the vertical. For one eye, the orientation is upper right to lower left. For the other eye, the orientation is upper left to lower right. This allows the wearer of the glasses to wear the polarizer lenses outside. If one lens was vertical, and the other horizontal then there would be a marked difference in how sun glare was blocked for each eye.

This technique produces a sense of 3-D even though the image itself is flat. The 3-D can be further enhanced. A two-dimensional image can contain three-dimensional information. A moving two-dimensional image provides data which can be used for comparison between the image at one time and the same image at another time. When looking out of the side window of a moving car or train, one can notice that the closer objects, such as telephone poles move by quickly while more distant objects, like trees and houses, appear to move by less quickly, and very distant objects, such as mountains and clouds, hardly appear to move at all. The moon appears stationary. Consequently, when there is movement in a scene, the degree of movement can often be reliably related to the depth position of the moving object.

This has been exploited in the Pulfrich effect, in which an observer wears a darkened filter in front of one eye when viewing a movie. The darkened filter essentially stops the functioning of the cones in the retina. These cones, which allow us to see in color, don't function in low light. Consequently, the darkened eye is seeing with its rods, which see well in low light even though they do not produce color. The undarkened eye sees primarily with its cones. Since the rods and cones send their signals to the brain at different speeds, one eye sends the brain an image of the scene at one time while the other eye sends the brain an image of the scene at a different time. If an object in the scene, such as a person, has moved somewhat between those two times, that object will appear to the brain to be in different locations on the two retinas while the remainder of the image, not having changed, will appear to the brain to be in the same locations on both retinas. Consequently the person will appear to be at a different depth than the rest of the image. Depending on which eye was darkened and in which direction the person moved, the person will appear either in front of or behind the rest of the scene. If the person sometimes moves in one direction and at other times moves in the other direction, the person will appear to be in front, at some times, and behind, at other times, of the rest of the scene. A pendulum swinging from left to right will appear to be rotating in a circle. A rotating wire-frame globe of the earth vasting a shadow on a flat surface will produce the appearance of a round fully three-dimensional globe in the vicinity of a flat surface.

The brain expects to see certain types of scenes and does not expect to see other types. For instance, the brain finds it normal for a person to be standing in front of a building, in which case part of the building is blocked by the person. On the other hand, the brain finds it abnormal to see a person standing behind the building wherein the person can be seen through a man-shaped hole in the building. In that case, the brain rejects its determination of dimensional location and suppresses depth. Consequently, when a person walks back and forth in front of a building in a two-dimensional movie, and the observer has a dark filter in front of one eye, the brain tends to see the person as being located in front of the building overall and the scene looks three-dimensional. Due to this occasional suppression of unacceptable 3-D perceptions, the 3-D experience is not as pleasing as it is in a true stereoscopic movie. In addition, since one eye sees only in black and white and sees a much dimmer image, the experience is annoying and less realistic.

In the preferred embodiment of the present invention, an electronic delay device is used between the video source and one of the video projectors. This provides an electronic analog of the Pulfrich effect without its drawbacks. Experience has shown that a delay of one field (equal to approximately 0.0167 seconds in N.T.S.C. television) to about 0.0245 seconds, is preferable, depending on the motion speeds within the movie, to produce a satisfactory 3-D effect for the majority of scenes. Longer delays, such as 0.0333 seconds, usually create too much eye strain because too much disparity is created between the image positions for the two eyes over any extended period. Too short a time period, however, reduces the eye-brain system's ability to perceive the three-dimensional effect due to the production of minimal changes in convergence from most regular movements.

This technique can produce 3-D in practically any two-dimensional video "on the fly" as the movie is shown. It will even work during scenes if the two images from the two projectors are precisely aligned with a horizontal displacement between them when there is no motion. Using both effects (delay and horizontal offset) in tandem enhances the 3-D experience. This is because there are scenes where there is little or no motion (without the horizontal offset described above). During those scenes, the image will still appear somewhat three-dimensional because it appears in a different location from the screen. Horizontally offsetting the images by a few pixels is sufficient to create the desired effect.

When individual objects in a scene move, they will be horizontally displaced differently in different successive frames. The faster an object moves, the larger the distance will be between the left and right eye images and thus the further behind or in front of the screen the image will appear to the viewer. Consequently, motion of objects should be coordinated with their depth to provide the most realistic three-dimensional imagery.

Figure 10:
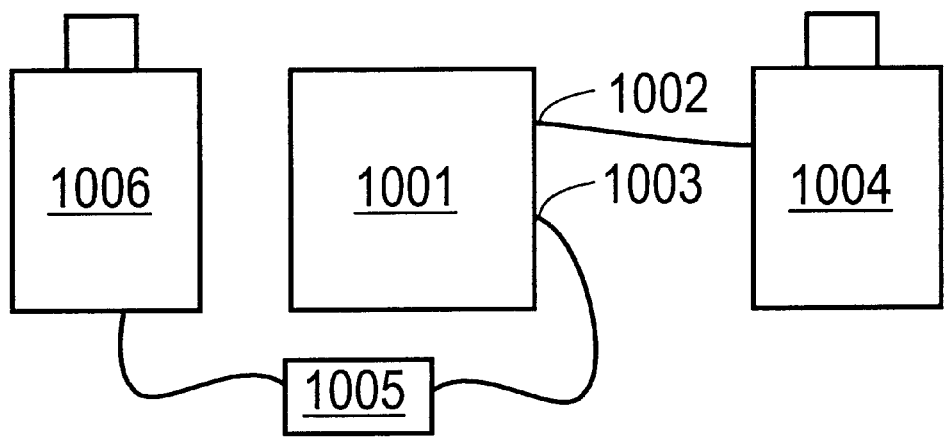
FIG. 10 is a plan view of a projector system for use with the present invention.

Referring now to FIG. 10, a video source (such as a DVD or Laser Disk player) 1001 provides a first video out 1002 and a second video out 1003 which are identical (such as by using a simple splitter). First video out 1002 passes to first electronic projector 1004. Second video out 1003 passes to an electronic delay device 1005 and from there to second electronic projector 1006. The video signal to the second projector 1006 is delayed for an appropriate interval depending on the content being displayed. In a preferred embodiment, first projector 1004 and second projector 1006 are Digital Projection's POWER 5 dv DIGITAL MICRO-MIRROR DEVICE (DMD) (Digital Projection, Inc. telephone number: 770-420-1350), and the delay circuit allows free adjustment of the interval.

A preferred embodiment of the system further utilizes a Pipeline 10 PL, 10 bit digital broadcast quality video delay system, commonly used for censorship delay of on-air feed which is produced by Prime Image Inc. (San Jose, Calif.; telephone number: 408-867-6519). It is custom fitted with an AD10, 10 second audio delay board to allow the sound to be delayed in synchronization with the video delay, a 10/2 time base corrector synchronizer to compensate for time base error inherent in videotape players and which also allows for adjustment of various video signal attributes such as luminance, chroma, setup level, sub carrier phase, horizontal phase, and horizontal offset (used to offset the images horizontally to produce depth even when there is no image movement), a high-performance encoder board to improve performance, and a three-way adaptive (with intelligent selection) comb filter board to separate luminance and chrominance and thereby reduce noise and distortions. When used in this application, AGC and input filtering are turned on and definition is set to high. Horizontal offset is set to the right at 31. The direct (preview) output, which bypasses any delay, goes to the projector projecting the image seen by the left eye, and the delayed output, coming out of "video out 1", goes to the projector which projects the image seen by the right eye. Audio delay is set to 0.026 seconds and video delay is set to 0.025 seconds. The imagery generally appears behind the screen (which is metalized).

Figure 11:
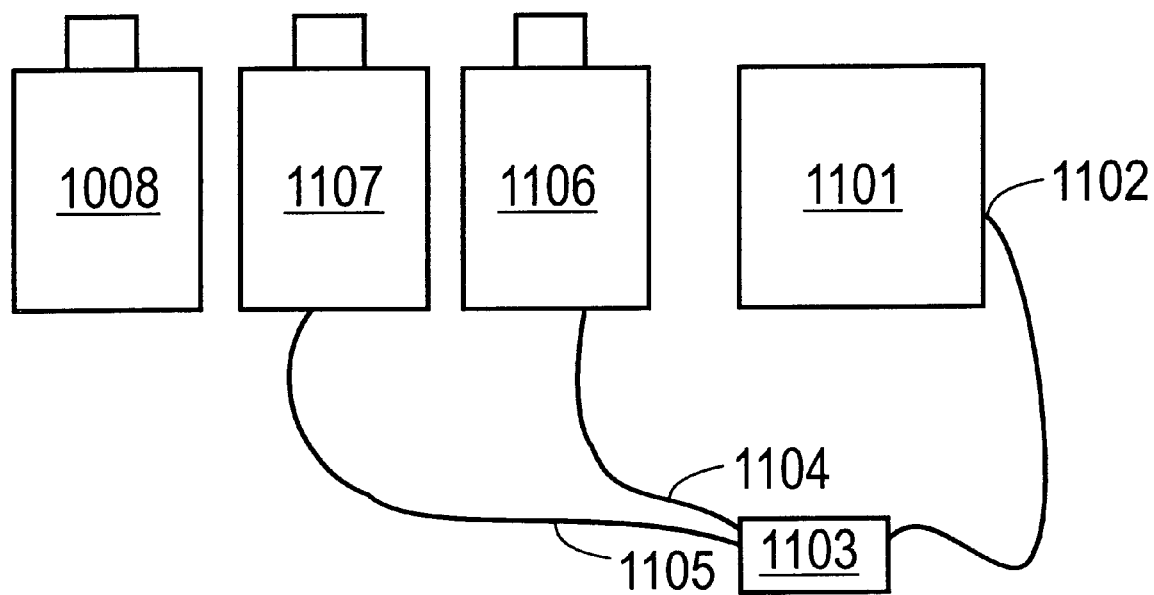
FIG. 11 is a plan view of a projector system for use with the present invention.

Referring now to FIG. 11, a video source (such as a DVD or Laser Disk player) 1101 provides a video out 1102. Video out 1102 passes the signal to an electronic delay device 1103. Electronic delay device 1103 provides a first video out 1104 and a second video out 1105. Electronic delay device 1103 provides an adjustable delay to either the first video out 1104 alone or to a second video out 1105. The electronic delay device 1103 is adjustable to allow control of the interval of the delay and in addition which projector (left eye or right eye) is delayed. In this fashion, moving objects may be kept in front of the background as desired. Projectors 1106 and 1107 are used to display output. Optional projector 1108 may be used to provide non-polarized landmark light by blurring, dimming, and/or slightly offsetting its output. Depending on the implementation, it is connected to the video source 1101 or to the electronic delay device 1103.

In general, it is preferred that the image appear behind the screen. This is so because it can be disturbing when parts of the image floating in front of the screen cut off for no reason. The brain rejects that as abnormal and suppresses the 3-D experience. If the object is cut off and it appears behind the screen, the mind perceives the screen as if it were a window which the brain accepts as normal. Images projecting out toward the viewers are spectacular if they stay within the frame and thus are not cut-off.

Figure 12:
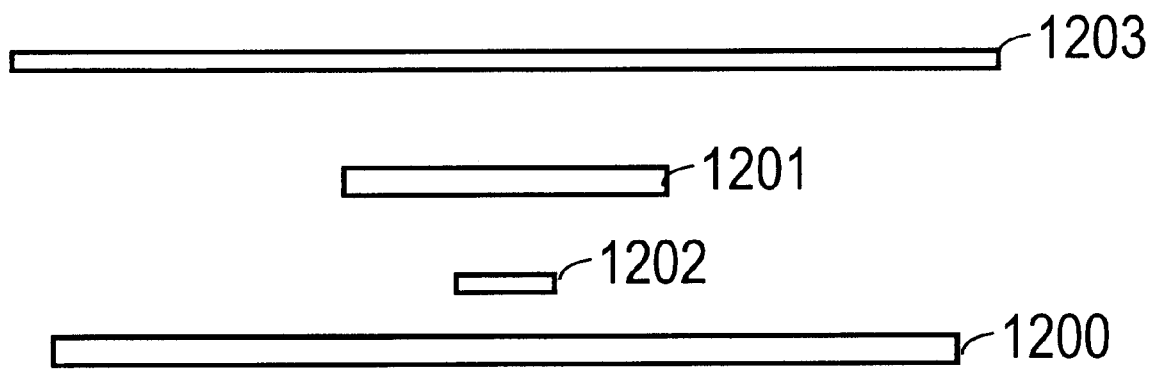
FIG. 12 is a plan view showing relative locations in space of images and the screen onto which they are projected.

Referring now to FIG. 12, projector output is displayed on screen 1200. The projector output is offset so that the image plane 1201 appears behind screen 1200. Location 1202 represents the location of an object within the projector output that is supposed to be in front of the image plane 1201. For example, image plane 1201 shows a view of a car and object 1202 is a person walking in front of the car. Location 1203 represents the location of a second object 1203 within the projector output, such as trees and mountains, that are supposed to be behind the image plane 1201.

Figure 13:
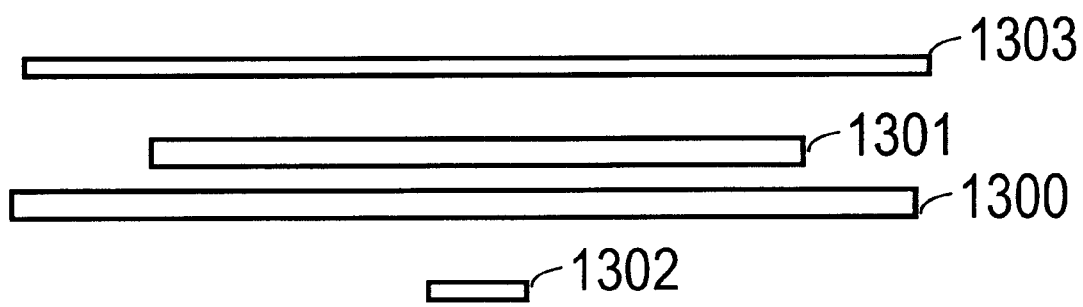
FIG. 13 is a plan view showing relative locations in space of images and the screen onto which they are projected.

Referring now to FIG. 13, projector output is displayed on screen 1300. The projector output is offset so that the image plane 1301 appears behind screen 1300. Location 1302 represents the location of an object within the projector output that is supposed to be in front of the image plane 1301 and in addition in front of the screen 1300. Location 1303 represents the location of another object within the projector output that is supposed to be behind the image plane 1301.

Additional 3-D depth enhancement

Depending on which projector's image goes to which eye and which projector's image is delayed and which direction an object in the scene moves, the 3-D image produced at that moment may or may not be acceptable to the brain. For instance, if an image of a slowly swinging pendulum is projected, as it swings from left to right, the image may appear in front of the screen as in FIG. 4. As the pendulum swings in the opposite direction, it may appear in back of the screen as in FIG. 2. This is because the relative position of the two images differs: in one case the 'lagged' frame causes the eyes to converge more while in the other case the 'lagged' frame causes the eyes to converge less.

Similarly a person pacing back and forth across a room would appear to be in front of the scene and behind the scene. Although the brain rejects 'incorrect' 3-D information, an enhancement to the present invention virtually eliminates the production of 3-D images that are not acceptable to the brain. Current digital chip technology is available for motion detection of images which can determine the direction of motion. If the system described above is set up so that motion to the right produces acceptable 3-D depth perception (e.g. the moving images appear in front of the screen as in FIG. 4), then motion to the left will somewhat detract from the overall 3-D experience (e.g. the moving images appear behind the screen as in FIG. 2). In a preferred embodiment, a motion detection chip system monitors image motion. When it detects motion to the left (in this example) of a significantly sized object in the scene, the system switches the output signals to the projectors. When this is done, motion to the left now causes the image to appear in front of the screen. When there is again motion to the right, the system again switches the outputs to the projectors, making images moving to the right appear in front. Thus, all movement remains in front of the background instead of switching back and forth.

Delay devices appropriate for use in the present invention are commercially available. One type uses a video delay line. Another system uses a tape delay in which a readout head reads the tape immediately after the write head has written on the tape. Still another system stores streaming incoming video in DRAM chips. These chips output their signal at a time selected by the user via an address allocation chip connected to a clock chip. In any case, it is preferable to use a switcher that is triggered by the vertical blanking pulse so that s witching is done at that time and is not noticeable to the observer. Such a switcher is available from Extron Electronics. As described herein, with this system, a separate track can also be recorded on the videotape (or other recording as described herein) which varies the delay so that scenes with motion that is too slow or too fast to produce satisfactory 3-D can s till produce good 3-D. Exaggerating the delay can produce a larger disparity between left and right eye images, creating the perception that an image is moving off the screen towards the observer (or, by decreasing the delay, away from the observer) as desired.

The major source of eye strain, headache, and nausea in stereoscopic video is vertical mis-alignment between the left and right eye images. Utilizing a delay device as disclosed herein has the potential to produce vertical mis-alignment of this type if an object moves vertically during the delay time. Consequently, the motion detector system should preferably also be set to detect vertical motion. If vertical motion (either up or down) of more than a bout two pixels (for a VGA resolution image) is detected, the switcher should send duplicate, undelayed images to the projectors during that time to eliminate such a vertical misalignment between the eyes. Alternatively, the image in the lagging frame can be erased and re-inserted at the same height as in the other new image. Optionally the space left from the erased image could be filled in by interpolation of surrounding areas. To do this an additional buffer or image storage location should be used. The software is designed to look at this data to determine vertical motion to provide time to erase and re-insert the moving object into the lagging frame before display on the second projector.

Figure 14:
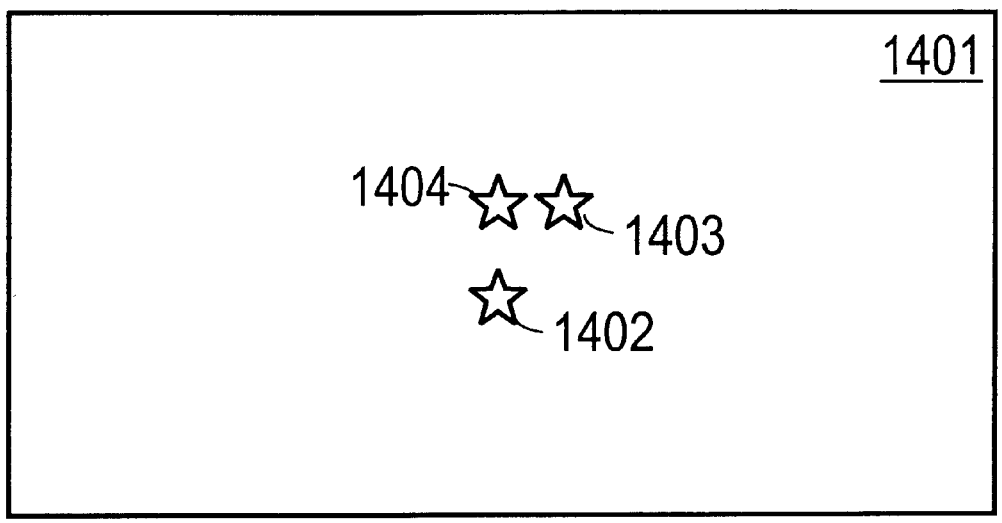
FIG. 14 is a head-on (i.e. elevation) view of a screen displaying image information.

Referring now to FIG. 14, a screen 1401 shows first image 1402 (output from a projector) which represents the 'lagging' frame and second image 1403 (output from another projector). In this example, the object depicted is moving diagonally up and right on the screen 1401. The 'lagging' frame therefore has vertical misalignment with the next frame. Accordingly, through software or a switcher, the first image 1402 is corrected and shifted upwards to corrected image position 1404.

So, for the case of an object which is rising, with no horizontal motion, it will have depth only to the same extent that the rest of the scene has depth. It is preferred that the system be equipped to follow an object (either on the fly through object recognition software or as marked in a pre-created track accompanying the film) and align the object vertically, while still providing the horizontal offset needed to place the object in a different plane. The moving image in the lagging frame can, for instance, be corrected vertically to eliminate vertical misalignment as well as additing an additional horizontal displacement, putting the object out in front since it moved (even though only vertically).

A similar problem occurs when objects shrink or grow. A simple delay circuit would similarly result in vertical misalignment. In such a case, the image of the object in the lagging eye's view should be reduced or enlarged as necessary by the same mechanism to eliminate vertical misalignment. The object should then be offset from the original as necessary.

Figure 15:
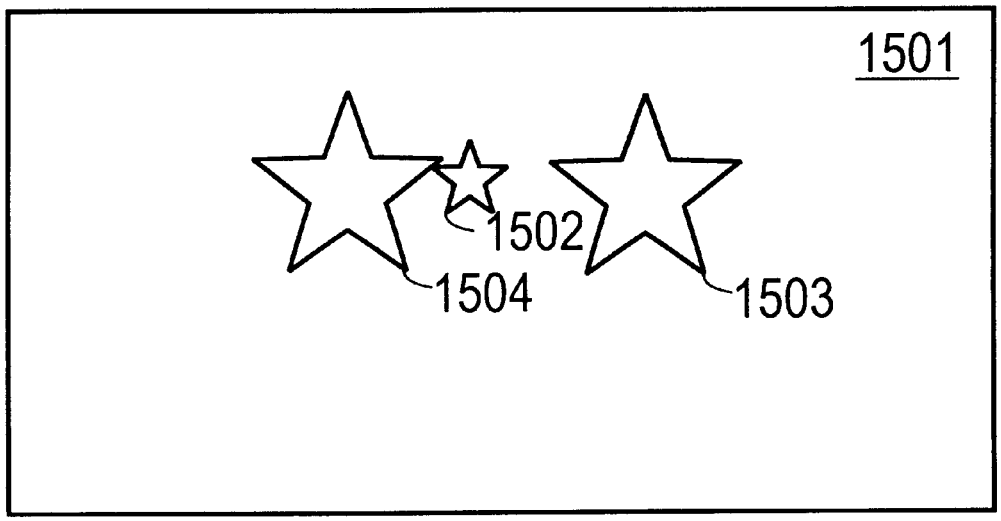
FIG. 15 is a head-on (i.e. elevation) view of a screen displaying image information.

Referring now to FIG. 15, a screen 1501 shows first image 1502 (output from a projector) and second image 1503 (output from another projector) which represents the 'lagging' frame. In this example, the object depicted is growing within the frame. The 'lagging' frame therefore has vertical misalignment. Accordingly, through software or a switcher, the lagging image 1502 is re-sized to match the second image and is displayed in position 1504.

Two-dimensional scenes also contain other information about the 3-D location of objects within it. Monitoring of spatial frequency, for instance, can detect the difference between near and far objects. Another method is to define objects by finding their boundary by looking for a major change in brightness and/or color and then counting the number of pixels within the object. This information can be used to designate objects as being in the foreground or background of the scene. Spatial frequency content also portrays the amount of fine detail or sharpness in an object, which normally decreases as an object gets further away. Detection of vertical placement within the frame also conveys information about depth since objects that are further away usually appear higher in the frame. Brightness, contrast, and color saturation all decrease in a scene as an object gets further away. Consequently, monitoring those factors give further information about an object's depth. By using a digital processing system that monitors all of these factors and uses fuzzy logic (which takes an average of the predicted depth location of an object predicted as a result of the assessment of each of these factors) one can further increase the accuracy of determination of the depth location of any object within a scene. Once depth has been determined for a particular image element, the delay and/or degree of horizontal displacement can be determined and implemented for projection, creating more accurate depth perception for the observer.

Figure 16:
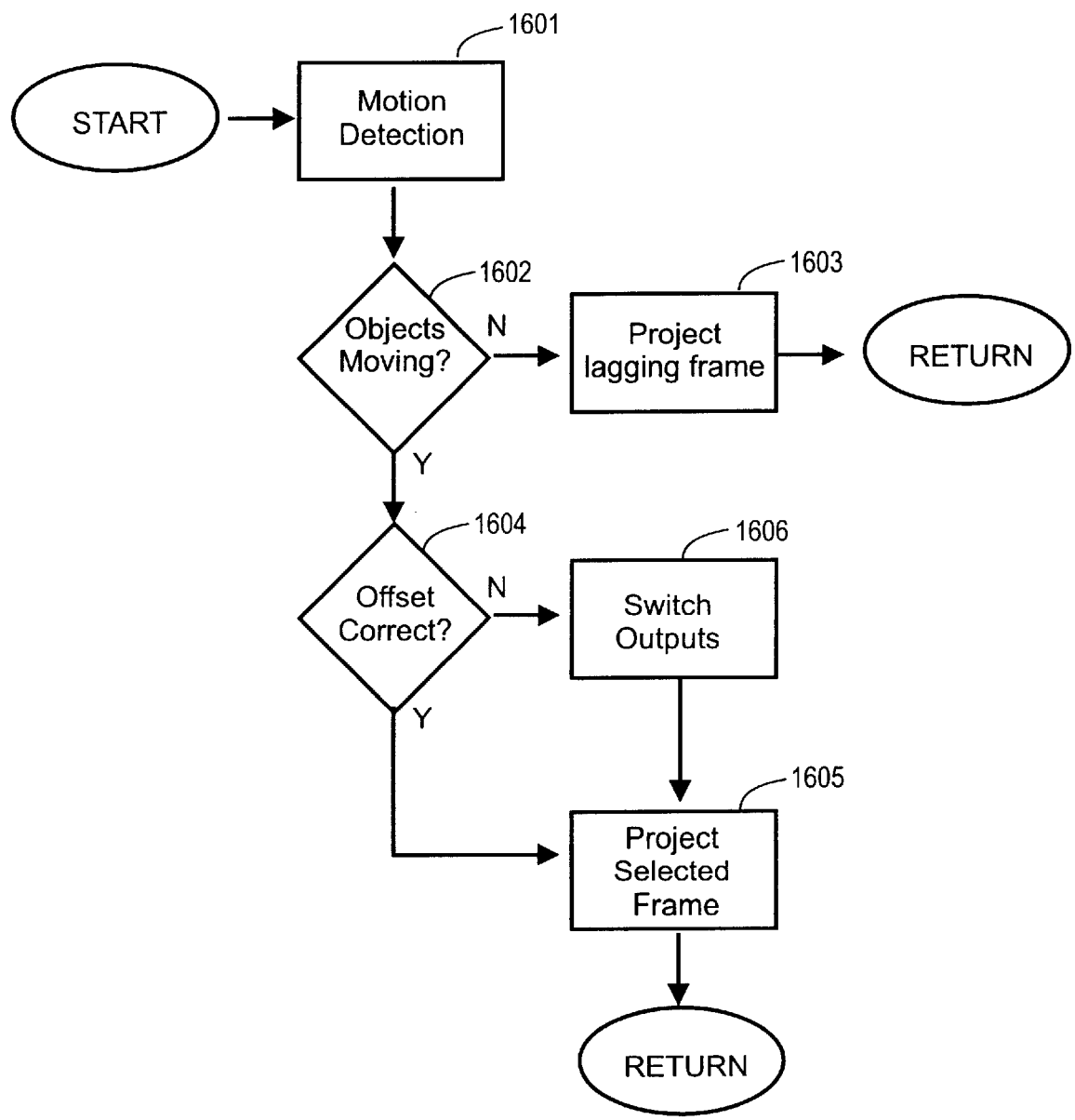
FIG. 16 is a flow diagram showing processes for selecting images for the present invention.

Referring now to FIG. 16, at process block 1601 motion detection is performed. In computer-implemented motion detection, a first frame and a second frame are compared to detect motion of objects in the frames. In manual- or computer-aided-implementations, a first frame and a second frame are examined by a person (or software) and tagged appropriately. A determination 1602 is made: if there is no appreciable motion within the frame then 1603 the lagging frame is displayed. If there is motion within the frame at determination 1602, then determination 1604 notes whether or not the motion is in the direction that will create acceptable output (e.g. the person walking in front of the building and not the person appearing behind the building). If the direction of motion will create acceptable output, then 1605 the lagging frame is projected. If the motion is in the direction that will create unacceptable output, the images are reversed through process 1606. Then 1605 the new frame is projected.

Figure 17:
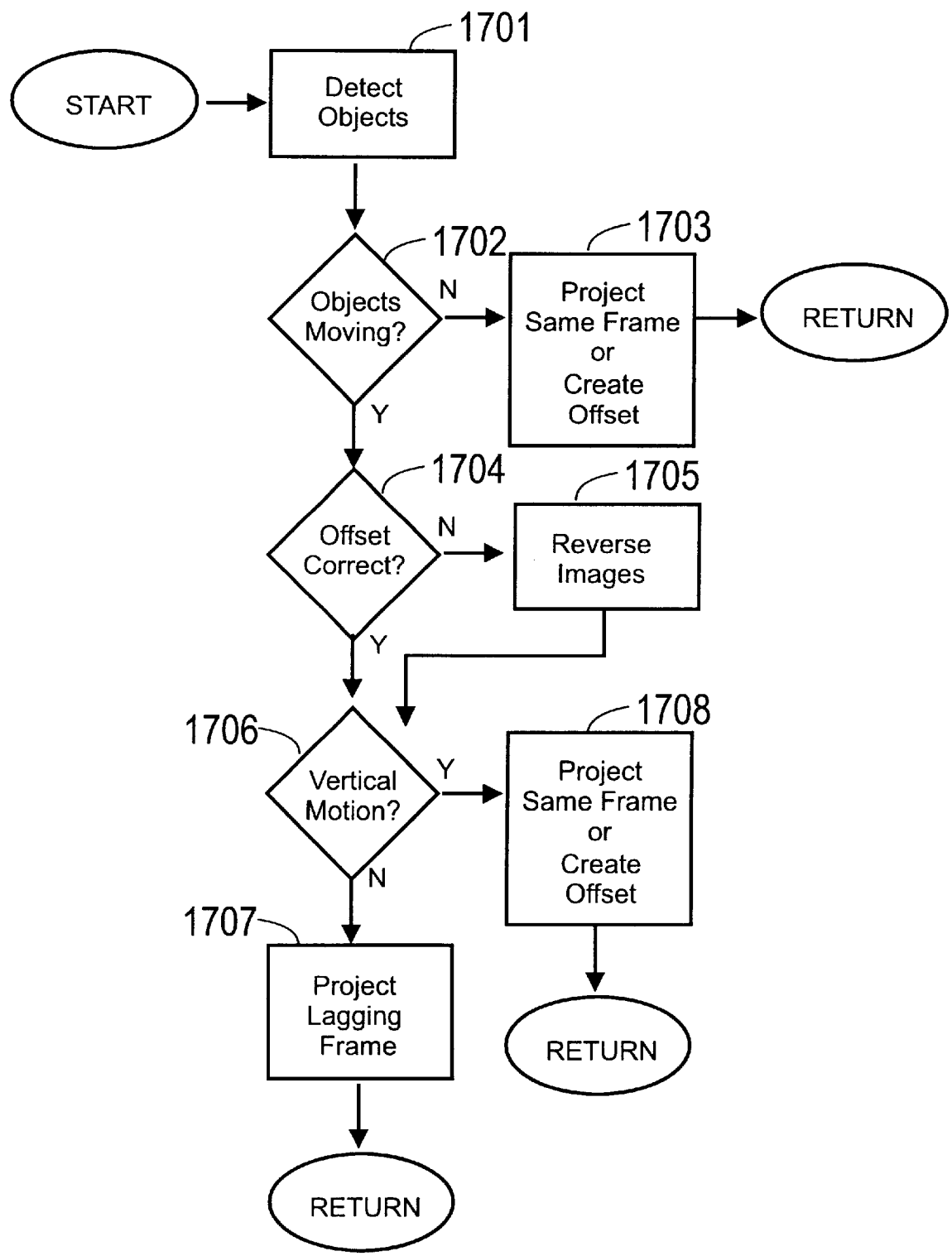
FIG. 17 is a flow diagram showing processes for selecting images for the present invention.

Referring now to FIG. 17, at process block 1701 object detection is performed. In a computer-implemented motion detection, a first frame and a second frame are compared to detect motion of objects in the frames. In a manual mode, a first frame and a second frame are examined by a person and tagged appropriately. A determination 1702 is made: if there is no appreciable motion within the frame then 1703 the original image is projected or the original image is modified so that certain object(s) positions are altered in a modified image to create depth in the scene. If there is motion within the frame at determination 1702, then determination 1704 notes whether or not the motion is in the direction that will create acceptable output (e.g. the person walking in front of the building and not the person appearing behind the building). If the direction of motion will create unacceptable output, the images are reversed through process 1705. In any event a determination 1706 is made regarding whether or not there is vertical motion within the image. If there is no appreciable vertical motion within the frame, then 1707 the frame deriving from the lagging frame is projected. If there is vertical motion within the frame, 1708 the original frame is projected. As with process 1703, process 1709 optionally includes processing the image to create an 'artificial' displacement within the second image so as to create an appropriate appearance of depth.

For further depth perception enhancement, instead of using a flat vertically oriented screen, other alternatives can be used. A convex screen can be used, for instance. Objects projected in the center of the screen usually are supposed to be closer to the observer. Due to the convexity, images projected in that area will actually be closer to the observer. This distance differential will be perceived by the observer as enhanced depth. Use of a very wide screen further enhances that perception, especially if the far ends of the screen curve towards the audience, creating a semi-circular screen area for the observer to look at by turning their head left and right. This increase of the peripheral view of the scene and greatly enhances depth. Further, curving or tilting the screen back so that the bottom of the screen is closest to the audience and the top of the screen is further from the audience enhances depth perception even further. This is because objects and imagery higher in the frame generally correspond to image elements that are further away from the observer.

Another technique can be used to display the above described images in depth, utilizing the above-described techniques. With this technique, however, there is parallax, allowing the viewer to move his head left and right to see around objects. The imagery is preferably shot with this system in mind if the depth created is to be realistic. By having the system store, for example, three frames at a time and project them with 3 projectors plus a 4th projector to project the current frame, (4 being the current frame being shown, for instance, and 1 being the frame which was shown four frames ago), a 3-D view is created using an autostereo screen as described herein.

This type of double lenticular screen, disclosed in the prior application of the inventor, cited in the beginning of this application, allows viewers to see a different frame with each eye without the use of special glasses. As the viewer moves, each eye sees a new element of a "pseudo stereo pair" creating parallax.

What is claimed is:

1. A system for displaying moving images pseudo stereoscopically, comprising:
   (a) a single source of sequential image information, comprising a series of source image frames adapted to be displayed sequentially over a period of time and not containing stereoscopic information captured at the origin of said series of image frames by virtue of not having been captured from two or more angles;
   (b) a first means, for sequentially displaying a first series of display image frames to one of the two eyes of an observer; and
   (c) a second means, for sequentially displaying a second series of display image frames to the other of the two eyes of an observer; and
   (d) means for generating from said single source of sequential image information for simultaneous sequential display an image frame A of said first series of display image frames and an image frame B of said second series of display image frames, wherein said image frame A is derived from a frame F1 of said series of source image frames and said image frame B is derived from a frame F2 of said series of source image frames, wherein said frame F2 is positioned in said single source of sequential image information to be displayed after said frame F1 by an amount of time T, the amount of time T being selected such that a typical observer experiences the display as a scene having depth.

2. The system of claim 1, wherein said amount of time T is between about 0.0167 and about 0.033 seconds.

3. The system of claim 1, wherein said amount of time T is about 0.025 seconds.

4. The system of claim 1, further comprising a screen on which the images are projected or otherwise displayed, the screen being at a distance D from an observer, wherein the image that is perceived by an observer upon binocular fusion of image frame A and image frame B when their content is identical appears to be at a distance from the observer that is different from said distance D.

5. The system of claim 4, wherein both image frame A and image frame B are placed so that they appear to be in front of the screen.

6. The system of claim 4, wherein both image frame A and image frame B are placed so that they appear to be behind the screen.

7. The system of claim 1, further comprising means for providing landmark light.

8. The system of claim 7, wherein said means for providing landmark light is at least one of the following: a spotlight; a source of uniform illumination; a source of a pattern of illumination.

9. The system of claim 7, wherein said means for providing landmark light is an illuminated frame placed near the display means.

10. The display system of claim 7, wherein said first means and said second means comprise means for providing first and second displays of image frames that are polarized complimentary to each other; and wherein said means for providing landmark light comprises a projector providing a non-polarized image derived from one of said source image frames.

11. The system of claim 1, wherein said first means and said second means comprise means for providing first and second displays of image frames that are polarized complimentary to each other.

12. The display system of claim 1, further comprising means for detecting an object in successive source image frames; means E for detecting a change in a property of said object in successive source image frames; means for adjusting the display of image frame A and image frame B responsive to the output of said means E.

13. A method for pseudo stereoscopically displaying moving images from a single source of sequential image information comprising the steps of:
   (a) providing a series of source image frames adapted to be displayed sequentially over a period of time and not containing stereoscopic information captured at the origin of said series of image frames by virtue of not having been captured from two or more angles:

(b) sequentially displaying a first series of display image frames to one of the two eyes of an observer;

(c) sequentially displaying a second series of display image frames to the other of the two eyes of an observer; and (d) generating from said series of source information frames for simultaneous sequential display an image frame A of said first series of display image frames and an image frame B of said second series of display image frames, wherein said image frame A is derived from a frame F1 of said series of source image frames and said image frame B is derived from a frame F2 of said series of source image frames, wherein said frame F2 is positioned in said single source of sequential image information to be displayed after said frame F1 by an amount of time T, the amount of time T being selected such that a typical observer experiences the display as a scene having depth.

14. The method of claim 13, further comprising:

(f) continually detecting an object in successive source image frames;

(g) continually detecting a change in a property of said object in successive source image frames; and (h) continually adjusting the display of image frame A and image frame B responsive to the detected change in said property of said object.

15. The method of claim 14, wherein:

said property is vertical position that has changed between frame F1 and frame F2 and said adjustment is modifying said image frame B derived from F2 of said series of source image frames such that said change in vertical position of said object is eliminated.

16. The method of claim 14, wherein:

said property is vertical position that has changed between frame F1 and frame F2 and said adjustment is modifying the value of time T to zero.

17. The method of claim 14, wherein:

said property is horizontal position that has changed between frame F1 and frame F2 and said adjustment reversing polarity when the change in horizontal position would result in a typical observer experiencing the display as a scene having unrealistic depth.

18. A three-dimensional viewing system capable of displaying a three-dimensional image to be seen by an observer, comprising the steps of:

taking a sequence of images not originally containing stereoscopic information by virtue of not having been captured from two or more angles;

storing at least one image in a buffer;

displaying a buffer stored image on the screen at the same time the current frame is displayed wherein two images are coded such that one image is directed to each eye of the observer, creating binocular fusion for the observer of all objects that have moved in time and space between the frames that are being simultaneously shown to the observer as well as those objects that have not.

* * * * *